April 10, 1945.  L. THOMS ET AL  2,373,356
MOTOR VEHICLE
Filed Dec. 21, 1942   5 Sheets-Sheet 1
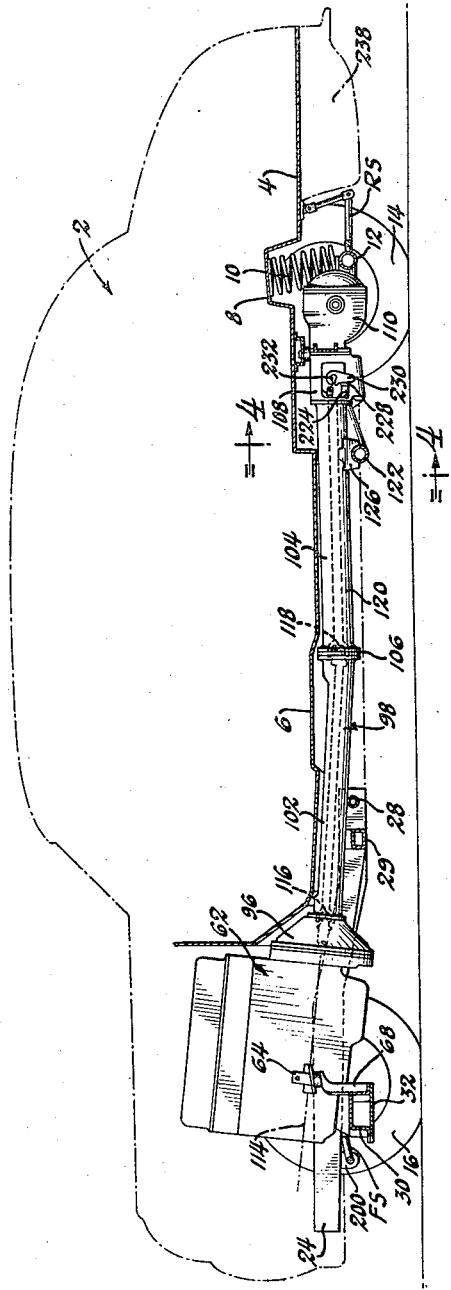
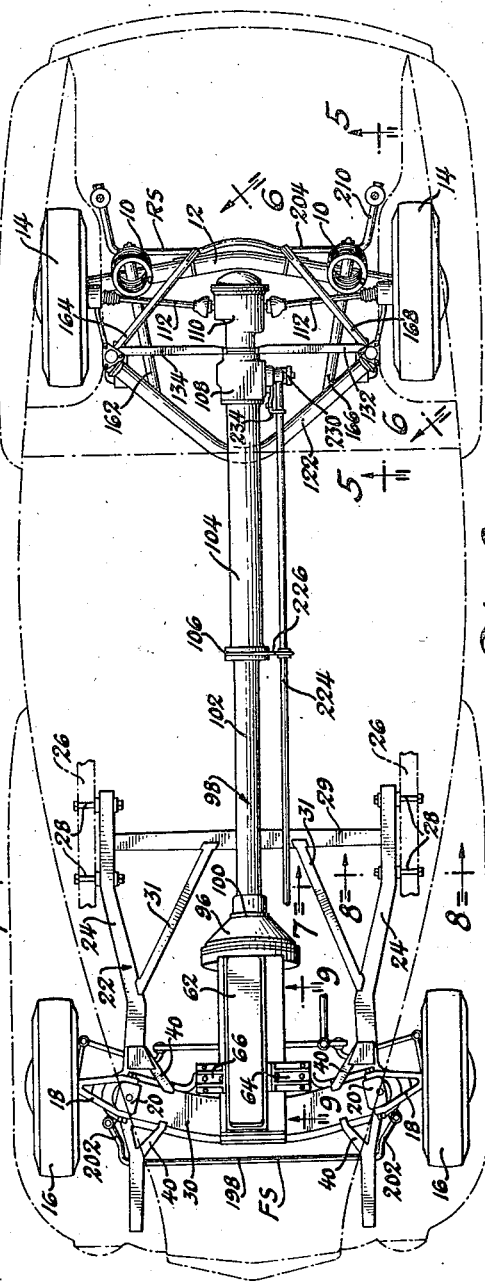
Inventors
Louis Thoms &
Dewey L. Maker
By
Blackmore, Spencer & Hiss
Attorneys April 10, 1945.  L. THOMS ET AL  2,373,356
MOTOR VEHICLE
Filed Dec. 21, 1942  5 Sheets-Sheet 2
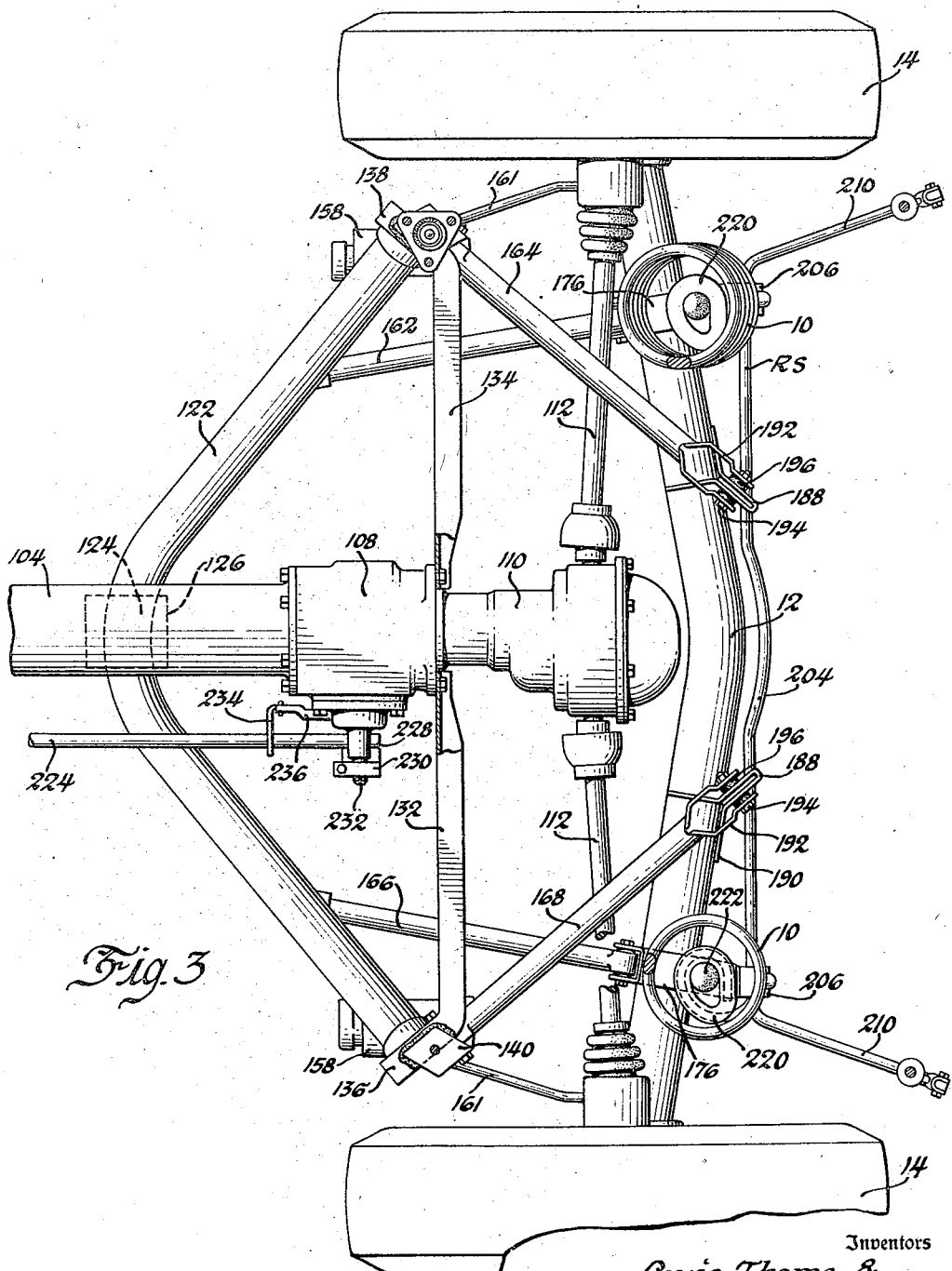

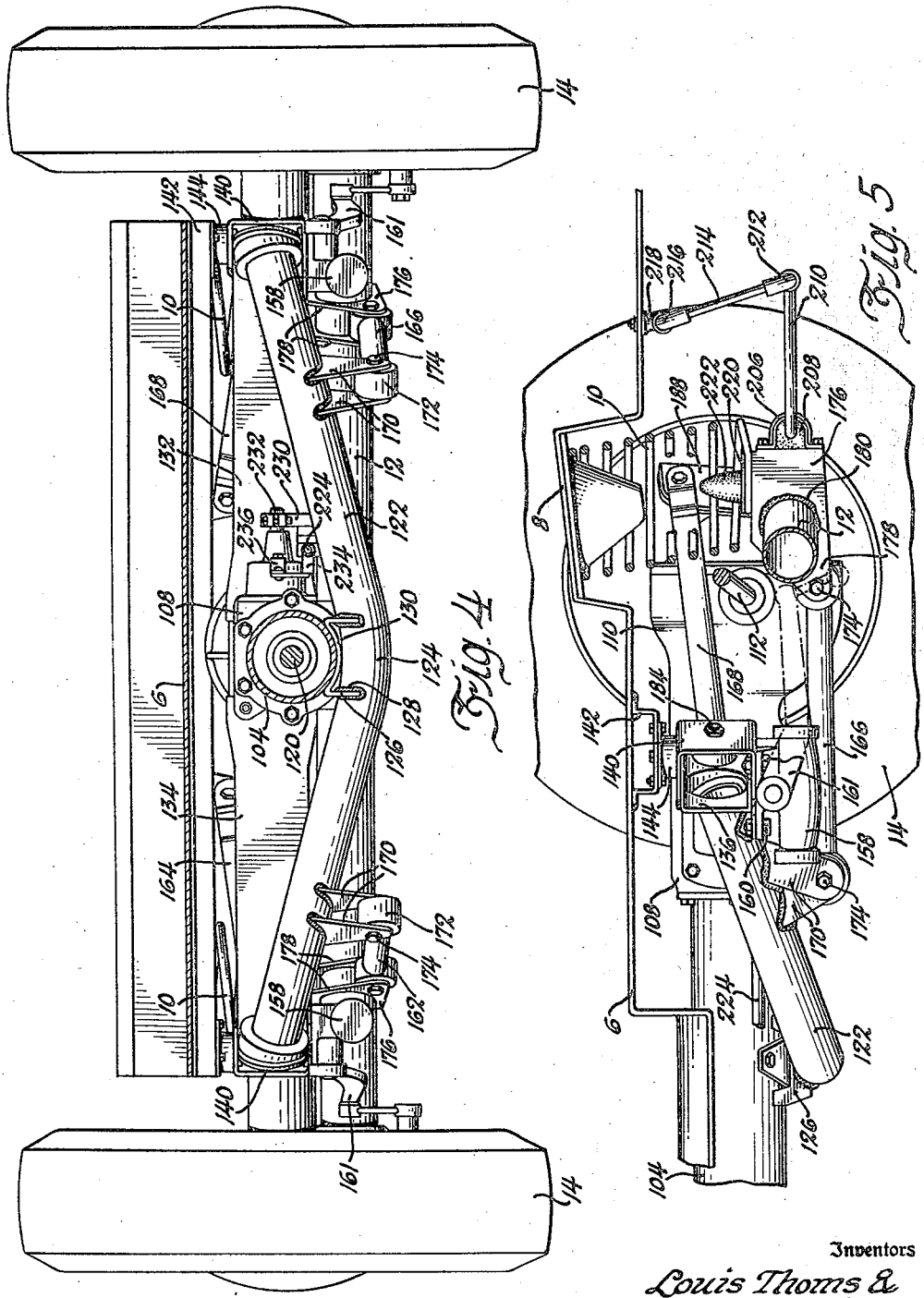

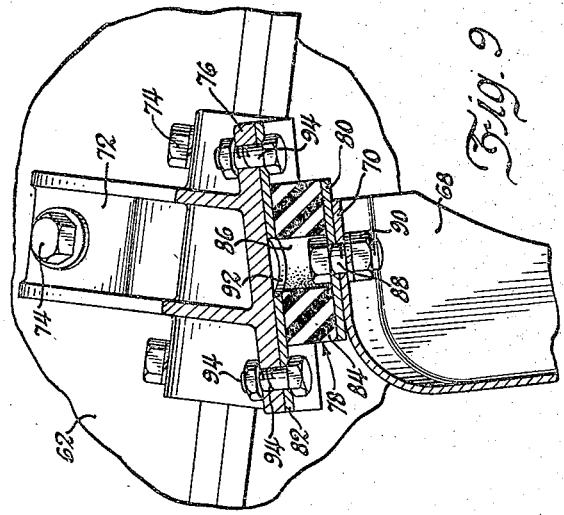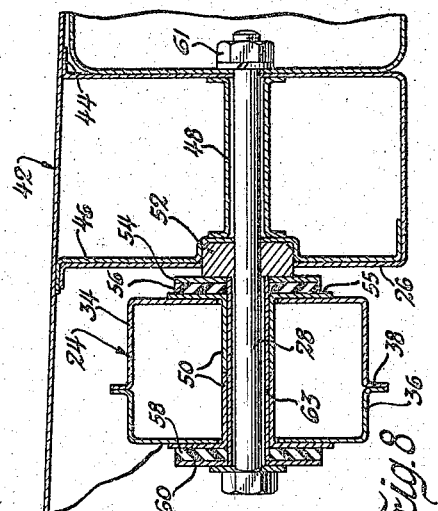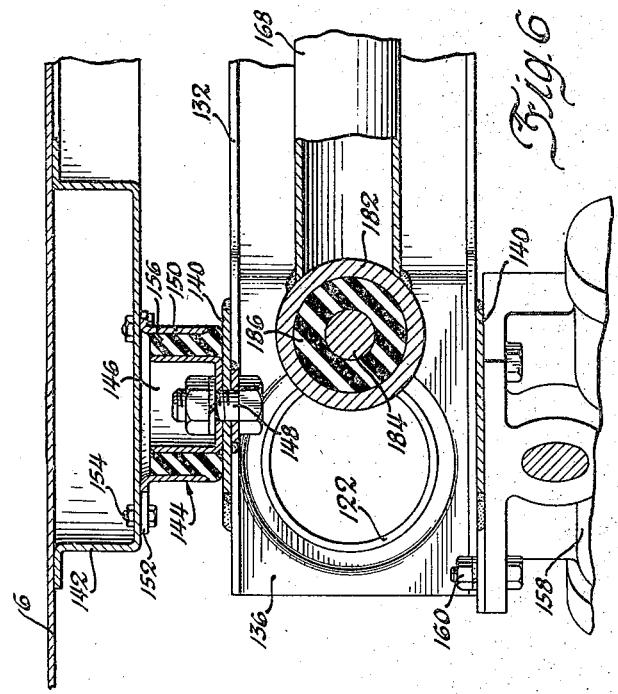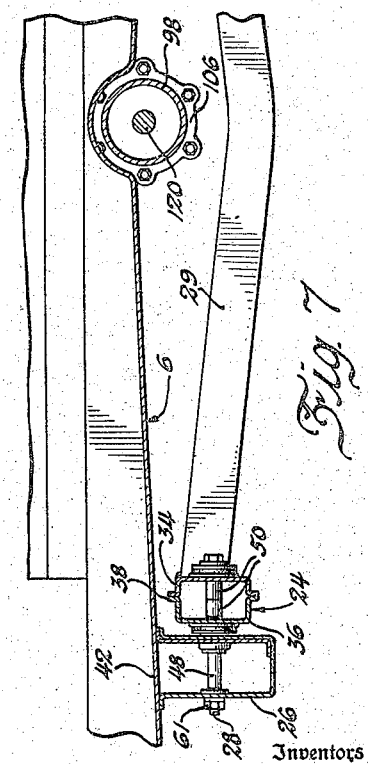

April 10, 1945.　　L. THOMS ET AL　　2,373,356
MOTOR VEHICLE
Filed Dec. 21, 1942　　5 Sheets-Sheet 5
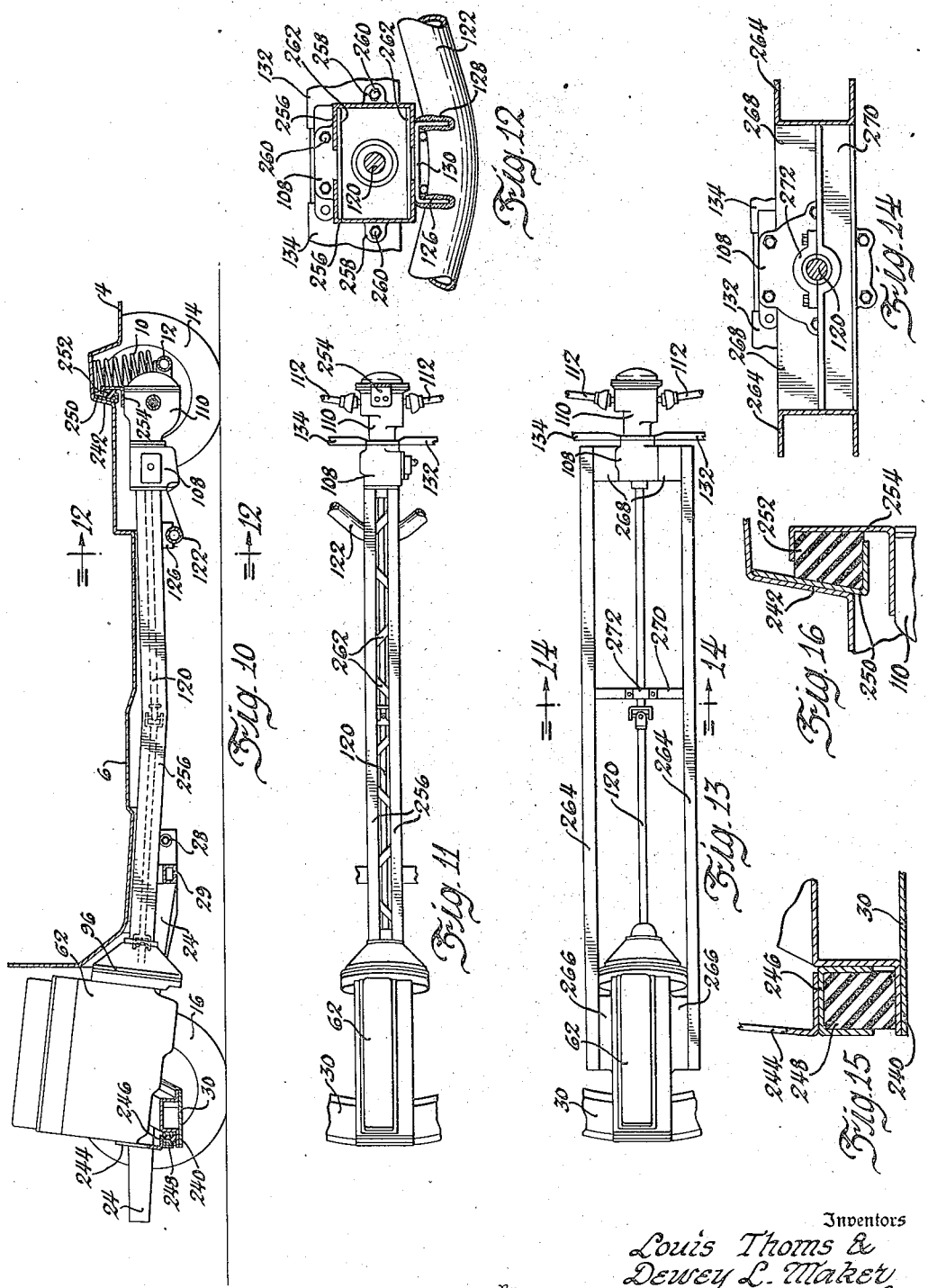
Inventors
Louis Thoms &
Dewey L. Maker
By
Blackmor, Spencer & Flint
Attorneys Patented Apr. 10, 1945

2,373,356

UNITED STATES PATENT OFFICE 2,373,356

MOTOR VEHICLE

Louis Thoms, Birmingham, and Dewey L. Maker, Pleasant Ridge, Mich., assignors to General Motors Corporation, Detroit, Mich., a corporation of Delaware Application December 21, 1942, Serial No. 469,614

11 Claims. (Cl. 180—54)

This invention relates to automotive vehicles and has particular reference to improvements in the mounting of the engine, the clutch housing, the propeller shaft tube, the transmission, and the differential carrier; the rigid interconnection of these parts; and their positioning to form a part of the sprung weight of the vehicle.

In the prior art it is customary practice to place the transmission at the rear of the engine and the clutch housing, and by means of a propeller shaft connect the transmission to the differential on the rear axle. The rear axle and differential are ordinarily a part of the unsprung weight of the vehicle, and road shocks and noises are necessarily transmitted to the vehicle through the propeller shaft forwardly to the transmission and the engine. In the prior art, the engine usually is mounted at four points, two at the front and two at the rear of the engine.

The present invention differs from prior art constructions in that a long tube connects the clutch housing at the rear of the engine with a transmission and the differential carrier placed at the rear of the vehicle. The engine, clutch housing, tube, transmission case, and differential carrier are all rigidly united, and the propeller shaft from the engine passes through the usual clutch and the tube and is connected to the transmission at the rear of the vehicle. A suitable shaft of the transmission extends rearwardly thereof and by means of a bevel gear is connected to the main gear of the differential. All of these parts are suspended from either the usual chassis or frame, or, as in the present case, from the underside of the body, the underframe of which is built sufficiently strong to be self-sustaining. With a body having a self-sustaining underframe, there is no frame or chassis as it is considered in the ordinary sense of the word.

Instead of a tube to interconnect the clutch housing and the transmission case, two channel irons or two tubes, one on each side of the propeller shaft, can be used.

The rigidly interconnected engine, clutch housing, propeller shaft tube, transmission case, and differential carrier does not form a unit which may be termed the backbone of the car because this unit in itself is not strong enough to sustain the vehicle or serve as a frame therefor. The unit is not a structural member which carries any of the load, but it is attached to and is supported by the frame or the underbody. The unit is attached to this self-sustaining underframe, or to the chassis, so that it can be properly supported and can form a part of the sprung part of the vehicle. The tube, however, is sufficiently stiff to keep it from whipping.

It is known rigidly to interconnect the engine, clutch housing, propeller shaft tube, transmission and differential, but in all instances of which we are aware this rigidly interconnected structural unit has been very strongly built and has formed the backbone or the frame of the vehicle. The transmission and differential of this prior art structure comprise sprung parts of the vehicle, but they are not attached to the underbody or to the frame to be supported thereby, but rather the body is built on or attached to this transmission and differential construction and receives its support therefrom.

The rear of the unit is supported by a V-shaped, transversely extending tubular brace. This brace extends under the longitudinally extending propeller shaft tube and is rigidly secured thereto at its middle or at the apex of the V. The two arms of the V extend rearwardly and have their ends connected to two transversely extending braces which are connected to the transmission housing and differential. This structure makes a rigid frame at the rear of the vehicle, and by connecting the braces to the underside of the body, (or to the ordinary frame as the case may be) the transmission and differential carrier at the rear of the vehicle are formed as a part of the sprung weight of the vehicle and are suspended from the underside of the body.

At the front of the vehicle the engine is supported at but two places, one at each side of the engine, adjacent the front end thereof, and these two supports at the front, together with the two supports at the rear end of the propeller shaft tube, are the only connections for mounting the engine, the tube, and the associated parts. Instead of the two lateral supports, but a single support at the front of the engine can be used. It is also possible to use but a single support at the rear to mount the differential and transmission. All of the supports comprise soft rubber which isolates the complete unit (engine, clutch, propeller shaft, transmission and differential) from the body. This isolation by soft rubber prevents road noises and transmission noises from being transmitted to the body. The noise making parts are tied together in a maximum mass and we are thus able better to absorb noises.

An incidental advantage of the long arm brought about by the propeller shaft tube is that the motor is restrained from bobbing, pitching or wobbling. In the ordinary mounting of the usual engine a rubber cannot be used which is too soft. If a rubber is used which is too soft, the motor floats or moves around in all directions. With the great distance between the front and rear mountings we are able to use a much softer rubber than it is possible to use with ordinary engine mountings.

At the rear of the vehicle the rear wheels are connected by an axle which is somewhat bowed so that its center part extends toward the rear of the vehicle, and in the bow of the rear axle the differential carrier is adapted to move in response to flexures of the springs.

The structure at the rear of the vehicle is united to the rear axle by means of four links, two at each side of the vehicle. At the rear ends the links are pivoted to the axle, and at their front ends to the bracing for the propeller shaft tube. If desired, the links can be pivoted to the frame or the underbody at their front ends.

The invention as illustrated on the drawings is adaptable to bodies of the type disclosed in the patents to Waterhouse 2,248,319 and 2,306,416.

The front end suspension is similar to that disclosed in the patents to Slack 2,063,704 and Olley 2,092,611 and 2,254,491.

On the drawings:

Figure 1 is a longitudinal sectional view through an automobile showing the invention applied, the upper part of the body being indicated in dotted outline.

Figure 2 is a plan view of the structure of Figure 1 with the body shown in dotted outline.

Figure 3 is an enlarged plan view of the structure at the rear of the vehicle, parts being shown in section better to illustrate the construction.

Figure 4 is a section on the line 4—4 of Figure 1.

Figures 5-9 inclusive are sections on the corresponding lines of Figure 2.

Figure 10 is a view similar to Figure 1 of a modification and showing but one support at the engine and only one support at the differential housing.

Figure 11 is a plan view of the structure of Figure 10.

Figure 12 is an enlarged sectional view on the line 12—12 of Figure 10.

Figure 13 is a plan view similar to Figure 11 of a modification.

Figure 14 is an enlarged section on the line 14—14 of Figure 13.

Figures 15 and 16 are enlarged sectional detailed views of the front and rear mountings, respectively, of Figure 10.

Referring to the drawings, the numeral 2 indicates an automotive vehicle as a whole. The vehicle has the usual body 4 having an underframe 6 which is self-sustaining and which is substantially the same as the underframe of the Waterhouse application Ser. No. 374,796, January 17, 1941, except that the channel shown in Figure 13 of the Waterhouse application is moved a little toward the center of the vehicle. The underbody has the upwardly extending pockets 8, one at each side of the vehicle, to form seats for the upper end of the coil springs 10 which mount the body from the rigid or dead axle 12 at the rear of the vehicle. The axle 12 is supported by the usual rear wheels 14.

At the front of the vehicle the usual front wheels 16 are supported by the usual coil spring type of independent front wheel suspension as shown in the mentioned patents to Olley and Slack. The upper arms of the spring suspension are shown at 18 and the usual shock absorbers at 20.

The front end has a frame 22 comprising the longitudinal members 24 connected to the channel members 26 of the underframe of the body by means of the bolts 28 which pass through the rear ends of the longitudinal members 24. The frame 22 has the rear transverse member 29 and the diagonal braces 31.

At their front ends the longitudinal members 24 extend underneath a transverse member 30 which is of inverted channel shape as is best shown in Figure 1. The lower part of the channel for the greater part of its extent is closed by means of a flat plate 32 which may be welded or bolted to the flanges of the channel. At the end of the transverse member 30, seats are formed for the usual coil springs of the front end suspension.

The longitudinal members 22 are formed of two channel members 34 and 36 secured by welding together their mating flanges 38. The inner channel member 36 is split intermediate its length and bent inwardly of the vehicle to form the braces or arms 40 which are secured to the transverse member 30.

The manner in which the longitudinal members 24 are secured to the channels 26 of the body is best shown in Figure 8. The floor of the vehicle is shown at 42 and the flanges 44 of the channel are secured to the underside of the floor. The channel has the inner reinforcing member 46 and the channel and the reinforcing member are provided with suitable openings for the passage of the bolts 28. A spacer 48 is positioned inside the channel 26 and spacers 50 are positioned inside the longitudinal member 24, the bolts passing through the spacers and through the longitudinals 24 and the channels 26. A suitable spacer 52 is set in a recess in the reinforcing member 46 and this spacer abuts against a washer 54 which is spaced from the outer flange 55 of the spacer 50 by a rubber washer 56. At the inner side of the longitudinals 24 there is a second rubber washer 58 which is positioned between the flange or one of the spacers 50 and an outer washer 60. All of the parts are secured together by tightening the nut 61 on the bolt 28. Preferably four connections such as shown in Figure 8 are used. If desired, a softer or rubber connection can be used by replacing the spacers 50 and the bearing sleeve 63 by a rubber cylinder and surrounding the rubber cylinder with a metal sleeve or shell.

The engine of the vehicle is indicated as a whole at 62, and is supported at but two points indicated at 64 and 66 which are positioned adjacent the front end of the vehicle. These supports are better shown in detail in Figures 1 and 9.

At each side of the vehicle a bracket 68 is secured at its lower end to the rear flange of the transverse member 30 and extends upwardly and has a shelf 70 at its top. Over the shelf 70 there is positioned a bracket 72 which is secured to the engine by the bolts 74, this bracket having an extension 76 which projects over the shelf 70.

Between the shelf 70 and the extension 76 there is positioned the rubber supporting unit indicated as a whole at 78 and comprising the lower metal plate 80, the upper metal plate 82, and the intermediary rubber doughnut 84. The rubber 84 is vulcanized to both plates 80 and 82 and is provided with an opening 86 to enable the passage of a bolt 88 secured to the shelf 70 by means of a nut 90. The upper plate 82 has an opening 92 therein, corresponding to the opening 86 in the rubber, to enable the passage of the bolt.

The upper plate 82 is provided with suitable bolt openings which mate with corresponding bolt openings in the extension 76 and suitable bolts 94 pass through the openings and secure the upper plate 82 to the extension 76.

At the rear of the engine there is rigidly mounted the usual clutch housing 96 having the usual clutch, and a propeller shaft tube 98 is rigidly secured to the clutch housing at 100. This tube 98 is in two parts, 102 and 104, united intermediate their ends by means of the flanges 106. The propeller shaft tube extends to the rear of the vehicle and at the rear end thereof there is secured the transmission case 108 which has the usual transmission mounted therein. Secured to the rear of the transmission case is the differential carrier 110 and from this differential carrier there extend the live shafts 112 which are connected to the rear wheels 14 to drive the same.

By referring to Figure 1, it will be noted that the front section 102 of the propeller shaft tube 98 is at a slight angle to the axis 114 of the crankshaft of the engine, and a universal joint 116 is positioned at the apex of this angle. Similarly, the tube section 102 is at an angle to the tube section 104 and a second universal joint 118 is placed in the propeller shaft 120 at the angle between the tube sections 102 and 104. The angle between the axis of the crankshaft 114 and the tube section 102 is the same as the angle between the tube sections 102 and 104 and the two universal joints in the propeller shaft 120 cancel the irregularities in each other so that the propeller shaft operates smoothly to drive the transmission in a uniform manner.

Referring to Figure 3, the rear of the vehicle is provided with a transversely extending V-shaped tubular brace 122, the apex 124 of the V being secured to the underside of the propeller shaft tube section 104 as is best shown in Figure 4. A saddle 126 has its feet welded as at 128 to the transverse brace 122 and the seat 130 thereof is welded to the underside of the propeller shaft tube section 104.

The transverse intermediate braces 132 and 134, channel shaped in cross section, are connected at their inner ends at the place of junction between the transmission case 108 and the differential carrier 110, and their outer ends 136 and 138 are bent at an angle of substantially 45° so that the web of the channel is in substantially the same plane as the ends of the transverse brace 122. The ends of the transverse brace 122 are then secured to the ends 136, 138 of the channel braces, as is best shown in Figures 3 and 5. The arrangement of the braces 122, 132 and 134 and their rigid interconnection with their interrelated parts forms a rigid bracing or bridge for the rear end of the propeller shaft tube and the interconnected transmission case and differential carrier.

At each end 136 and 138 of the braces 132, 134 there is rigidly secured a U-shaped bracket at 140. This bracket is placed on its side so that the web of the U will be vertical and the upper and lower flanges of the bracket are rigidly secured as by welding or riveting to the ends 136 and 138.

On top of the upper flange of the brackets 140 there are mounted the connections between the bracing and the underside of the body (or of the usual frame as the case may be). The underside of the underframe 6 of the body has secured thereto a suitable channel 142 and between the channel 142 and the bracket 140 the interconnecting structure 144 is mounted. This structure (Figure 6) comprises a lower cup-shaped element 146 having an opening in its bottom and secured by means of a bolt and nut 148 to the bracket 140 and end 136. An upper collar 150 is provided with a flange 152 by means of which it is secured to the channel 142 through the intermediary of the bolts and nuts 154. The collar 150 and cup 146 are spaced from each other and between the two there is positioned the cylinder of rubber 156 preferably vulcanized to parts 146 and 150. The rubber at its bottom extends partly over the outside of the edge of the collar 150 as is best shown in Figure 6.

There are two mountings such as shown in Figure 6 at each side of the vehicle, and while these mountings have been illustrated as being positioned at the place of junction of the braces 122 or 132 or 134, it is within the purview of the invention to place these mountings farther inward toward the center of the vehicle on the braces 132 or 134.

These two supports, as shown in Figure 6, together with the two supports for the engine at the front of the vehicle and illustrated in detail in Figure 9, comprise the only supports for the engine and its rigidly interconnected clutch housing, propeller shaft tube, transmission case, and differential carrier. This gives two pairs of widely separated supports for the engine, propeller shaft, transmission and differential, and all of these suspensions are in soft rubber. For this reason, noise or shocks which are likely to be transmitted to the body from the road are absorbed in the rubber, which results in a much smoother ride to the vehicle and is noticeable to passengers sitting in the body.

On the lower flange of the bracket 140 at each side of the vehicle, there is mounted the usual hydraulic shock absorber 158. This shock absorber is secured to the flange of the bracket 140 and to the flange of the brace 136 by means of suitable bolts and nuts 160. The shock absorbers have the arms 161, the rear ends of which are link connected either to the brake backing plate or to the axle.

In order to connect the rear axle 12 to the underside of the vehicle and to maintain the proper position of the axle under the body, a linkage system comprising the links 162 and 164 at the right side of the vehicle (when considering Figure 3) and the links 166 and 168 at the left side of the vehicle is provided. The lower links 162 and 166 are secured to the underside of the V-shaped brace 122 as is best shown in Figure 4. The underside of the brace has welded thereto the brackets 170 between which an eye 172 on the end of the links 162 or 166 is pivotally held by means of a bolt 174. At the rear end the links 162 and 166 are connected to the forward end of a block 176. This block is provided with spaced ears 178 between which there is positioned a second eye similar to the eye 172, and a bolt 174 passes through the ears 178 and through the eye in the end of the link to hold the link to the block 176. The blocks 176 are rigidly secured to the rear axle 12 by welding as indicated at 180.

The upper links 164 and 168 are secured at their front ends inside the space formed by the brackets 140 and the ends 136 or 138 of the braces 132, 134. This structure is best shown in Figures 5 and 6. The braces 164, 168 have an eye 182 at their ends, and this eye is secured in place by means of a bolt 184 which passes through the eye and through openings in parts 140 and 136.

Each of the eyes 174 or 182 at the ends of the links is provided with a rubber bushing 186 as is best shown in Figure 6. This rubber bushing fits tightly in the eye and around the bolts, reduces noise, and makes an oilless bearing.

At their rear ends the links 164 and 168 are secured to the upper part of brackets 188 rigidly secured at their lower ends 190 to the rear axle 12. The rear ends of the links are forked as indicated at 192, and these forks straddle the upper part of the brackets 188 and are pivotally connected thereto by means of bolts 194 which pass through suitable openings in the forks and in the brackets 188. Suitable oilless non-metallic universal joints 196 are provided to reduce friction.

The up and down motions of the rear axle 12 and the wheels 14 will compress the rear coil springs 10 and cause the axle 12 and the body underframe 6 to approach toward and recede from each other, and this relative movement of the two will cause the links 162, 164, 166, and 168 to hinge or move on their pivots and at the same time maintain the relative position of the axle 12 under the body. By referring to Figure 3, it will be noted that the links on one side are crossed relative to each other. The purpose of this is to maintain a more accurate position of the axle under the vehicle and to permit a substantial straight up and down motion of the wheels and axle relative to the body.

The vehicle is provided at its front with the usual front stabilizer FS and at the rear with the usual rear stabilizer RS. The front stabilizer comprises the usual transverse bar 198 supported in bearings 200 secured to the underside of the longitudinals 24. The ends of the bar 198 are bent rearwardly as indicated at 202, and these ends are united by suitable links to an unsprung part of the vehicle (not shown).

At the rear end, the rear stabilizer RS comprises the transverse bar 204 mounted in bearings 206 secured to the rear of the blocks 176. These bearings comprise the usual rubber bushing 208. The ends of the transverse bar 204 are bent rearwardly as indicated at 210, and the ends of these bars are pivotally connected at 212 to an upwardly extending link 214 pivoted at 216 to a bracket 218 secured to the underside of the body.

Both stabilizers operate in the usual way for the types of stabilizers shown.

The lower ends of the rear springs are mounted on top of the blocks 176. The lower coils of the springs are slightly smaller and are held to the blocks by means of a retainer 220 secured to the block by means of a suitable bolt and nut (not shown). The retainer 220 is shaped so that it can receive the lower smaller coil of the spring rigidly to hold it on the seat.

A rubber buffer 222 is secured to the retainer 220 by the same bolt which holds the retainer on the block 176.

A gear shift rod 224 exends from the front of the vehicle to the transmission 108 at the rear. This rod is supported intermediate its length by a bracket 226 secured at the joint 106 of the tube 98. The rod is operated by a suitable lever mechanism (not shown) from the driver's seat. The rod is pivoted at its rear end at 228 to a lever 230 secured to a shaft 232 journaled in the transmission case and which has secured thereto the usual forks for shifting the gears.

The shifter rod 224 has rigidly secured thereto a lever 234 loosely joined to a lever 236 which is rigidly secured to a shaft which extends into the transmission and which acts as a selector for the shifter fork.

To operate the gear shifting mechanism, the rod 224 is first rotated to operate the selector levers 234 and 236; the rod is then shifted longitudinally to move the lever 230 and operate the shaft 232 which will shift the gears.

Instead of a gear transmission, a hydraulic or fluid transmission can be used.

The usual fuel reservoir is indicated in dotted outline at 238.

The structure of Figure 10 differs from that of Figure 1 in that but a single support 240 is used at the front to support the engine, and but one support 242 is used at the rear. The front support 240 is positioned on the centerline of the vehicle and at the center of the front face of the engine 62 and comprises a downwardly extending bracket 244 having its lower end bent at an angle and secured to a short channel iron 246. A block of rubber 248 is received in the channel 246 and this rubber block rests on the forwardly extending flange of the transverse member 30. If desired, the rubber can be vulcanized to the channel and to the flange.

The rear support 242 is likewise positioned on the centerline of the vehicle and comprises a bracket 250 secured to the underframe 6. The bracket has a rearwardly extending lower end on which a block of rubber 252 is secured. A second bracket 254 is secured to the top of the differential. This bracket 254 extends upwardly at the rear side of bracket 250 and the rubber block 252 and has a forwardly directed flange at its upper end. This flange rests on top of the rubber block 252 and is vulcanized thereto.

The engine 62 and transmission case 108 are rigidly interconnected by two spaced channel irons 256. These channel irons are used instead of the tube 98 of Figure 1, and are rigidly connected to the clutch housing and to the transmission case by means of flanges 258 and bolts 260 as shown in Figure 12. The two channels 256 are connected by cross pieces 262 welded or otherwise secured thereto.

The construction illustrated in Figures 10, 11 and 13 has the advantage of a two-point in-line suspension in rubber for the interconnected unit comprising the engine, clutch housing, channels, transmission case and differential carrier. This suspension enables an easy absorption in the rubber of noises caused by the movement of the parts when the vehicle is traveling over the road. This construction will also allow the engine to sway or rock more freely in its mounting and thus prevent the transmission of shocks to the body.

When the mounting shown in Figures 10 and 11 is used, the connections to the frame or the underbody as shown in Figure 6 are not used but a rubber buffer can be placed on the ends 136 and 138, or between these ends and the frame or the underbody. A steady-rest or support comprising rubber can also be put on the transverse frame member 29 to support the channels 256.

Figures 13 and 14 show another species of the invention in which two channel irons 264 rigidly interconnect the engine 62 to the transmission case 108. Spacers 266 are rigidly secured in any suitable way to the engine 62 and to the channels 264 at the front end of the vehicle and spacers 268 are rigidly secured to the transmission case 108 and to the channels 264 at the rear end. This structure directly connects the engine 62 to the transmission case 108 without directly connecting the channels to the clutch housing.

Intermediate the length of the bars 264 there is secured a transverse brace 270 which has a bearing 272 for the propeller shaft 120. The mounting of the engine and of the transmission and differential carrier may be the same as shown in either of the other species.

We claim:

1. In an automotive vehicle having a spring suspended frame, an engine flexibly mounted by a single support at the front of the vehicle, a rigidly interconnected transmission and differential at the rear of the vehicle, means rigidly to interconnect the engine and transmission, and means flexibly mounting the transmission and differential at a single point on the frame at the rear of the vehicle, said mountings causing said transmission, differential and interconnecting means to be supported wholly from said frame and enabling them to carry none of the load of the vehicle.

2. In an automotive vehicle having a frame, a rigidly interconnected engine block, clutch housing, propeller shaft tube, transmission case and differential carrier, a propeller shaft in said tube, said propeller shaft being connected to the transmission in the transmission case, a transverse reinforcing member at the rear of the vehicle rigidly secured to the tube, means extending between the ends of the transverse member and the transmission case and rigidly interconnecting the transverse member to the transmission case, means to secure the transverse member and said means to the frame to support the tube, rear wheels to the vehicle, means resiliently to suspend the frame from the rear wheels, and drive shafts extending from the differential carrier to the rear wheels to drive the same.

3. In an automotive vehicle having a spring suspended frame, a tube below the frame extending longitudinally of the vehicle and enclosing a propeller shaft, a transverse V-shaped brace at the rear of the vehicle and the tube, said brace being rigidly connected to the tube at substantially the angle of the V, a transmission case connected to the rear end of the tube, lateral braces rigidly connected to the ends of the transverse brace and to the transmission case, and means to secure said tube and said brace to the frame.

4. In an automotive vehicle having a spring suspended frame, a propeller shaft tube, a transmission case and a differential carrier rigidly secured together at the rear of the vehicle, said transmission case being rigidly secured to the end of the tube, a transverse brace having its central part rigidly secured to the underside of the tube and its arms extending laterally from the tube, secondary braces rigidly secured to the ends of the transverse brace and to the place of junction of the transmission case and differential carrier, and means rigidly to secure the braces to the frame.

5. In an automotive vehicle having a spring suspended frame and a body, an engine at the front of the vehicle, a support at each side of the engine to hold the engine in place, a clutch housing rigidly secured to the rear of the engine, means rigidly secured to the clutch housing and extending to the rear of the vehicle, a transmission housing rigidly secured to the rear of said means, bracing means at the rear of the vehicle rigidly secured to said first-named means and to the transmission housing, and means rigidly to secure the bracing to the frame.

6. The invention of claim 5, the support for the engine at the front of the vehicle and the means to secure the bracing to the frame including rubber to make a soft joint or connection to prevent noises entering the body of the vehicle.

7. In a vehicle having a spring suspended frame, a rigidly interconnected engine clutch housing, propeller shaft tube, transmission case, and differential carrier, a propeller shaft in said tube connecting the engine to the transmission in the transmission case, rear wheels connected by a rigid axle having its center bowed or bent rearwardly, spring means to suspend the body from the axle, the differential carrier extending rearwardly into the bowed part of the axle, drive shafts extending from the differential carrier to the rear wheels to drive the same, and means to secure the tube, the transmission case and the differential carrier to the frame.

8. In a vehicle having a frame, a rigidly interconnected engine block, clutch housing, propeller shaft tube, transmission case, and differential carrier, a propeller shaft in said tube connecting the engine to the transmission in the transmission case, rear wheels connected by a rigid axle having its center bowed or bent rearwardly, spring means to suspend the frame from the axle, the differential carrier extending rearwardly into the bowed part of the axle, drive shafts extending from the differential carrier to the rear wheels to drive the same, a transverse bracing at the rear of the vehicle rigidly connected to the tube and transmission case, means to secure the bracing to the frame, and a linkage pivotally interconnecting the bracing and the rear axle to maintain the relative position of the axle under the vehicle.

9. In a vehicle having a frame, a rigidly interconnected engine, clutch housing, propeller shaft tube, transmission case, and differential carrier, a propeller shaft in said tube connected to the transmission in the transmission case, rear wheels connected by a rigid axle having its center bowed or bent rearwardly, spring means to suspend the frame from the axle, the differential carrier extending rearwardly into the bowed part of the axle, drive shafts extending from the differential carrier to the rear wheels to drive the same, a transverse bracing rigidly connected to the tube and the transmission case, means to secure the bracing to the underside of the body, and two links at each side of the vehicle pivotally interconnecting the bracing and the rear axle to maintain the relative position of the axle under the vehicle.

10. In a vehicle having a spring suspended frame, an engine supported from the frame, a rigid assembly comprising a clutch housing, a transmission case, a propeller shaft tube, and a differential carrier rigidly secured together and extending the length of the vehicle, said assembly being rigidly secured to the engine, transverse bracing secured to the rear end of the assembly, and means to secure the assembly and the bracing to the vehicle frame, the means for securing said bracing to the frame being positioned at the ends of said bracing.

11. In a vehicle having a spring suspended frame, an engine supported from the frame, a rigid assembly comprising a clutch housing, a transmission case, a propeller shaft tube, and a differential carrier rigidly secured together and extending the length of the vehicle, said assembly being rigidly secured to the engine, transverse bracing secured to the rear end of the assembly ahead of differential carrier, and means to secure the assembly and the bracing to the vehicle frame, the means for securing said bracing to the frame being positioned at the ends of said bracing.

LOUIS THOMS.
DEWEY L. MAKER.